EDWIN A. LINK
*INVENTOR.*

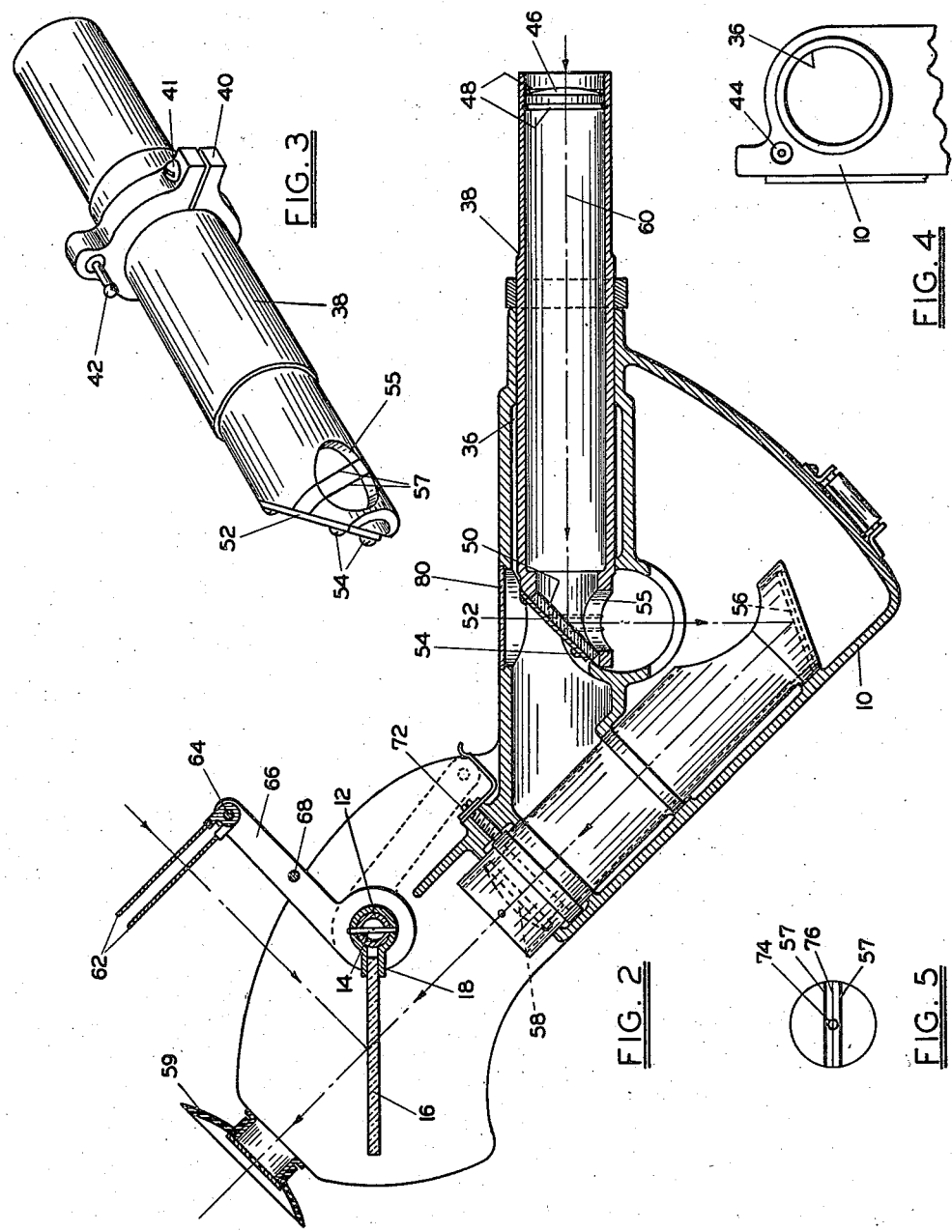

Feb. 26, 1946. E. A. LINK 2,395,559
NAVIGATION INSTRUMENT INCLUDING A HORIZON ATTACHMENT
Filed Aug. 30, 1943 3 Sheets-Sheet 3

EDWIN A. LINK
*INVENTOR.*
BY
*ATTORNEYS*

Patented Feb. 26, 1946

2,395,559

UNITED STATES PATENT OFFICE 2,395,559

NAVIGATION INSTRUMENT, INCLUDING A HORIZON ATTACHMENT

Edwin A. Link, Binghamton, N. Y.

Application August 30, 1943, Serial No. 500,515

3 Claims. (Cl. 88—2.4)

This application is a continuation in part of the copending application of myself and Harold A. Marsh, Serial Number 387,074, filed April 5, 1941, for "Navigation instrument." (This application has matured, since the filing of this application, into U. S. Patent 2,359,484 dated October 3, 1944.)

It is the general object of my invention to provide an attachment for use with sextants in general and in particular for a sextant of the type described in the above-mentioned copending application whereby the navigator may, by viewing the real horizon, place the instrument in proper position for taking a sight or series of sights upon a celestial body.

It is a more particular object of my invention to provide a horizon attachment which may be easily and quickly secured to the sextant when it is desired to level the instrument by viewing the real horizon and which may be quickly and easily removed from the sextant when it is no longer needed.

It is another object of this invention to provide in a sextant of the type mentioned means whereby the navigator may level the instrument by the use of an artificial horizon which comprises a bubble unit assembly or by the use of the horizon attachment described in this application, either of which leveling means may be detached from the instrument when the other is being used.

It is a further object of this invention to provide in a horizon attachment for leveling the instrument a plurality of horizontal wires whose images are visible to the navigator when using the instrument whereby the relative positions of the images of the wires and of the horizon will enable the navigator to quickly and accurately level the instrument.

The foregoing and other objects of my invention will become appreciated as the description proceeds, reference now being made to the accompanying figures which show a preferred embodiment of the invention. In the drawings, Fig. 1 is a general perspective view of the instrument showing the horizon attachment affixed thereto.

Fig. 2 is a general cross sectional view of the instrument.

Fig. 3 is a perspective view of the horizon attachment.

Fig. 4 is an elevational view of a portion of the instrument.

Fig. 5 illustrates the images of the horizon, leveling wires and celestial body as seen by a navigator using this invention.

Figure 1:
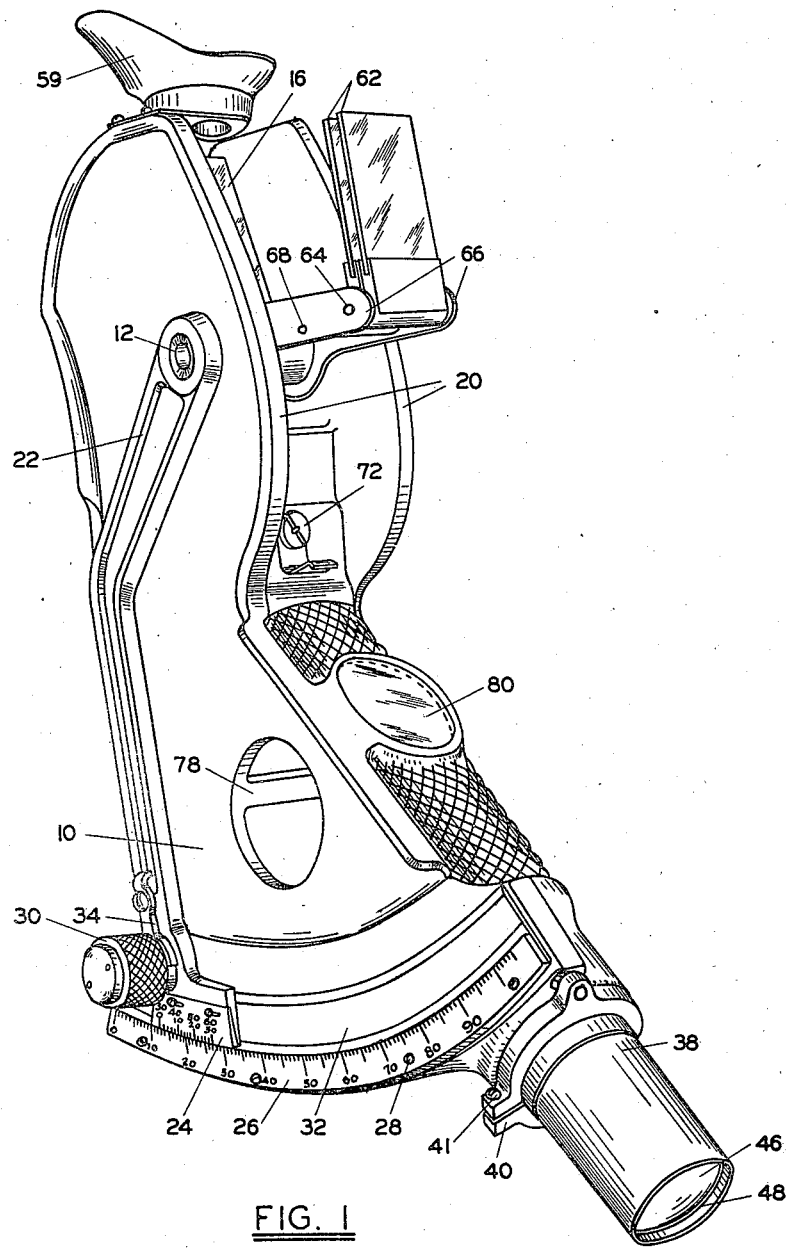

As described in the above-mentioned copending application such a sextant comprises a casing 10 which is preferably of a one-piece construction in order to render the instrument simple and rigid. This casing is preferably of a light metal construction such as aluminum but may be composed of any other suitable material. As seen in Fig. 2, transverse shaft 12 is mounted for rotation in suitable bearings (not shown) which are held in a fixed position by the casing 10. An index mirror 16 has affixed to its lower end a clamp 18, the other end of the clamp surrounding and being rigidly affixed to shaft 12 by pin 14. As seen in Fig. 1, the casing 10 comprises a pair of upwardly extending furcations 20 and the index mirror 16 is free to move therebetween.

Rigidly affixed upon one of the ends of shaft 12 is the index arm 22 which moves along the outside of the casing. A vernier scale 24 is affixed to the lower end of the index arm 22 and cooperates with an arc 26 which is rigidly affixed to the lower outside of the instrument housing 10 by means of screws 28. This arc is graduated in degrees from zero through 90 and has a suitable radius of curvature for cooperation with vernier scale 24 as the index arm 22 moves back and forth along the side of the housing 10. By means of vernier scale 24 and graduated arc 26 the altitude of the celestial body being observed as represented by the position of the index mirror 16 may be determined. Adjusting knob 30 is provided, and by a rotation of this knob the lower end of index arm 22 is moved.

This movement of the lower end of the index arm 22 results in a rotation of the transverse shaft 12 and of the index mirror which moves with the shaft.

Referring to Fig. 2, it will be seen that the housing 10 is formed to provide a chamber 36 and the exterior of the housing 38 of the horizon attachment is formed complementary to the chamber 36. As seen in Fig. 3, a split collar 40 may be tightened upon the outside of housing 38 by means of screw 41 and formed integrally with this collar is positioning stud 42. A bore 44 seen in Fig. 4 is placed in main housing 10 for the reception of this positioning stud. As seen in Figs. 1 and 2, the objective lens 46 of the horizon attachment is positioned at the foremost end thereof and is held in position by a pair of snap rings 48 which fit into suitable grooves in the horizon attachment housing 38.

Positioned within the rear end of the horizon attachment housing is a first surface mirror 50 which is held in position by a metal plate 52 which is affixed to housing 38 by means of small screws 54. A circular opening 55 is cut in the lower rear end of the horizon attachment and a pair of tightly drawn fine wires 57 are stretched thereacross. Suitable grooves are provided for the proper positioning of these wires, the ends of which are anchored to the screws 54.

An assembly known as the image reflecting unit is positioned along the base of the instrument. This assembly includes a second first surface reflecting mirror 56 near the lowermost point of the sextant and a collimating lens 58 positioned between this mirror and the index mirror 16. Collimating lens 58 and objective lens 46 have the same focal lengths.

When the instrument is held in sighting position the longitudinal axis 60 of the horizon attachment is in the horizontal plane and, therefore, points directly toward the distant horizon. Light rays forming the image of the horizon enter through the objective lens 46 and travel to the first surface reflecting mirror 50 and are deflected through the opening 55 to the second first surface reflecting mirror 56. This mirror reflects the light in the direction of the collimating lens 58 which lens renders the light rays parallel. The rays then strike the index mirror 16, a portion of them passing through this mirror while the remainder are reflected thereby.

Those familiar with the use of a sextant or similar instruments will understand that the function of the index mirror 16 is to bring into coincidence the image of the horizon as reflected by the mirror 16 and the image of the celestial body being observed. For observations upon the sun and moon, the navigator places one eye above the eye positioning piece 59 which is suitably affixed to furcations 20 and brings the image of the sun or moon as reflected upwardly by the index mirror 16 into coincidence with the image of the horizon as seen by looking directly through the index mirror 16 toward the collimating lens 58 and first surface reflecting mirror 56. In the event the observation is being made upon the sun or the moon the shades 62 will be positioned as shown in Fig. 2. As seen in that figure, these shades are individually pivotally held by a shaft 64 which in turn is held by a pair of extending arms 66, the other ends of which are pivotally mounted upon the transverse shaft 12. When not in use these shades 62 may be pivoted about the shaft 64 so that their upper ends move to the left as seen in Fig. 2 until the lower shade is against the stop 68 held by the arms 66. These arms may then be pivoted about the shaft 12 until the rightmost end or ends thereof are engaged by the clip held on the outside of the housing 10 by screw 72.

In the event the navigator is taking an observation upon a celestial body other than the sun or moon, he places his eye to the left of the furcations 20 as seen in Fig. 2 and by means of the knob 30 moves the index arm 22 and index mirror 16 until the image of the celestial body as viewed directly through the index mirror 16 and the image of the horizon as reflected by the index mirror are in coincidence.

Fig. 5 shows the relative positions of the images which the navigator should see when the index mirror 16 and index arm 22 are positioned to give the correct altitude in degrees and minutes of the body being sighted. It will be seen in that figure that the image of the star 74 is coincident with the image of the horizon 76 and that the images of the wires 57 are parallel with the image of the horizon and equally spaced therefrom. The provision of the wires 57 therefore serves a dual purpose, viz., to level the instrument transversely and longitudinally.

Seen in Fig. 1 is another chamber 78 in the housing 10 of the instrument. As described in the above-mentioned copending application and shown in Fig. 6, chamber 78 may hold the bubble unit assembly designated generally 79. This assembly comprises a gaseous bubble 79a surrounded by liquid 79b enclosed in a suitable metallic container 79c. The exterior of the assembly 79 is complementary to certain of the walls of chamber 78 in order that the assembly may be easily and quickly placed in proper position in the instrument and likewise removed therefrom.

Figure 6:
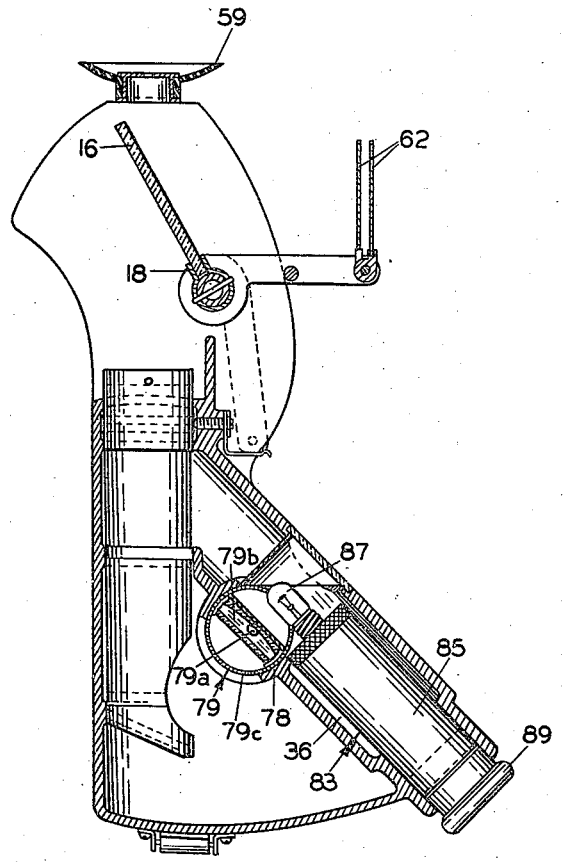
Fig. 6 is a cross sectional view of the instrument showing the lighting unit and bubble unit assemblies.

Also, as described in the mentioned co-pending application and shown in Fig. 6 is a lighting unit assembly designated generally by 83 and comprising a casing 85 holding a battery, a bulb 87 and knob 89 which controls a switch and rheostat. The exterior of asembly 83 is complemental to certain of the walls of chamber 36 so that the lighting unit assembly may be readily inserted therein and removed therefrom. As seen in Fig. 2, chamber 36 also may hold the horizon attachment.

In celestial navigation, when the real horizon is not visible artificial means must be used in order to level the instrument while sighting upon the celestial body. In order to accomplish this the most generally employed means is a leveling bubble such as that mentioned above. In the event this expedient is used, in order to ascertain the altitude of the celestial body the image of the celestial body is brought into coincidence with the image of the bubble in the same manner that the image of the horizon is brought into coincidence with the image of the celestial body as described above. In the instrument being described, the bubble is illuminated either by means of the aforedescribed lighting unit assembly, in the event the observation is being made at night, or by the natural illumination which may enter the instrument through the glass window 80 in the top of the instrument. Light rays traveling from the bubble are reflected from the first surface mirror 56 through the collimating lens 58 to the index mirror 16. In the event the natural illumination is not sufficient the bubble unit assembly may be illuminated by means of the aforementioned lighting unit assembly. If the bubble unit assembly is being used, the horizon attachment is unnecessary and, therefore, is removed from the instrument by the navigator whereupon the lighting unit assembly may be inserted in its place. On the other hand, whenever it is desired to level the instrument by a reference to the real horizon natural illumination must, of course, be sufficient in order that the same is visible and, therefore, neither the bubble unit assembly nor the lighting unit assembly is necessary. The navigator using this instrument therefore removes the bubble unit assembly and the lighting unit assembly and places the horizon attachment in operative position. Observations may then be taken using the real horizon to level the instrument.

The collimating lens 58 has a focal length equal to the distance from its optical center to the position occupied within chamber 78 by the bubble of the bubble unit assembly and, therefore, the image of the bubble is clearly visible by the navigator when the bubble unit assembly is being used. The objective lens 46 of the horizon attachment has a focal length equal to the distance from its optical center to the same position occupied by the bubble of the bubble unit assembly when it is inserted in the instrument. Therefore, whenever the navigator is using the horizon attachment to level the instrument the image of the horizon is in the focal plane of the collimating lens 53 and will be clearly seen by the navigator.

It will be seen in Fig. 2 that the wires 57 of the horizon attachment when the attachment is inserted in the instrument are in the approximate position occupied by the bubble of the bubble unit when the bubble unit is placed in the sextant in the place of the attachment and, therefore, the images of the wires will also be seen by the navigator when the horizon attachment is in use.

From the foregoing, it will be realized that my invention provides means whereby a navigation instrument of the type being considered may be leveled by a reference to the real horizon or by the use of an artificial horizon. In the event the real horizon is being employed as a reference the artificial horizon means (bubble unit assembly) as well as the lighting means may be withdrawn from the instrument, thereby decreasing the weight of the instrument which results in a greater ease in use. On the other hand, if the artificial horizon is being used, the natural horizon attachment may be removed and the bubble unit assembly may be placed in operative position. Also the lighting unit may be inserted in the event that artificial illumination is necessary.

The readily removable bubble unit assembly, lighting unit assembly and horizon attachment provide a lighter, more compact instrument which may be leveled by the use of the real horizon or by the use of an artificial horizon.

I claim:

1. A horizon attachment for a sextant comprising a housing, an objective lens in the end of said housing away from the observer, a mirror inclined at an angle to the longitudinal axis of the attachment at the end thereof remote from said lens, an opening in said housing arranged to allow passage therethrough of the light rays reflected by said mirror, and a wire drawn across said opening.

2. A sextant comprising a collimating lens and means for viewing the horizon for leveling the instrument, said horizon viewing means comprising a housing having an objective lens, a mirror inclined at an angle to the longitudinal axis of said housing at the end thereof remote from said lens, an opening in said housing arranged to allow passage therethrough of the light rays reflected by said mirror, and a wire drawn across said opening, said wire and the focal plane of said objective lens being in the focal plane of said collimating lens.

3. A sextant comprising a housing having opposite faces of the general outline of a right triangle; a spaced pair of furcations extending approximately as continuations of the opposite faces of the housing; a chamber formed inside said triangular housing along the hypotenuse boundary thereof; a horizon attachment removably mounted in said chamber, said horizon attachment comprising a housing complementary to said chamber, an objective lens held by the outer end of the attachment housing and a mirror held by the other end of the attachment housing and arranged to reflect the light rays from said objective lens downwardly; an image reflecting assembly comprising a mirror and a collimating lens positioned along the side of said housing opposite said horizon attachment, said image reflecting assembly comprising a mirror positioned optically adjacent the mirror of said horizon attachment so as to catch the light rays from the mirror of said horizon attachment and reflect them through said collimating lens; an index mirror pivotally mounted between said furcations so as to intercept the light rays from said collimating lens; and indexing means operatively connected to said index mirror for indicating the position of the same.

EDWIN A. LINK.